Sept. 8, 1959            E. A. KOPS            2,902,898
OPTICAL INSPECTION DEVICE FOR TRANSPARENT SHEET MATERIAL
Filed July 28, 1954
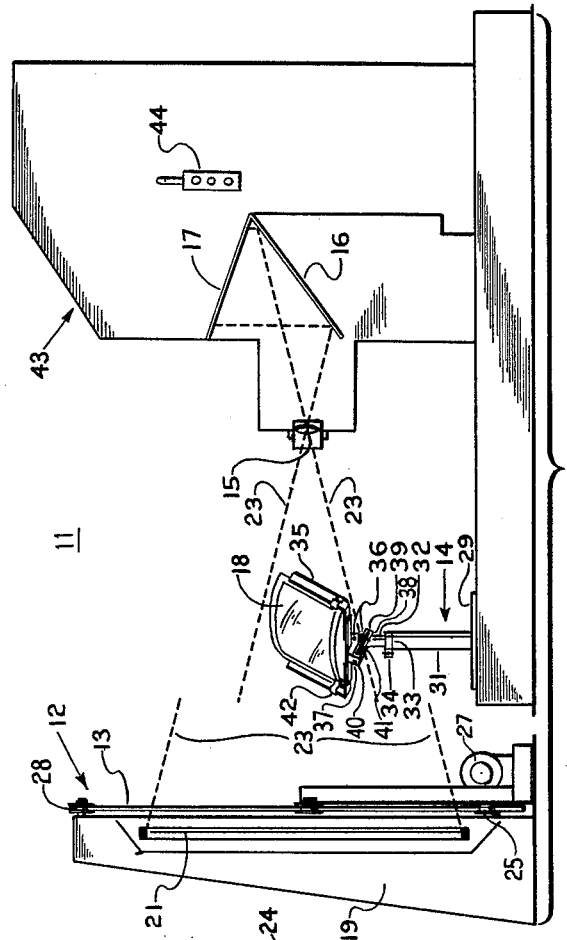
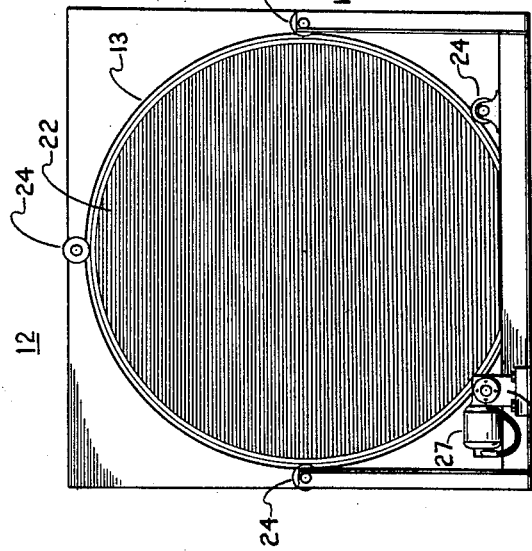
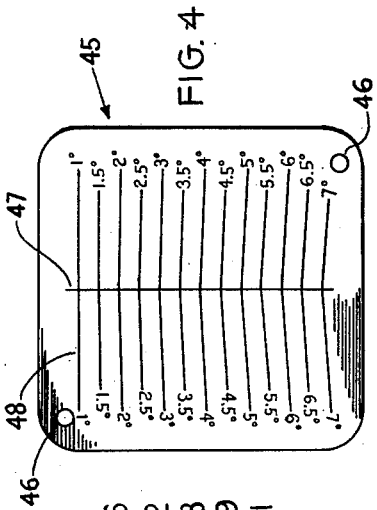
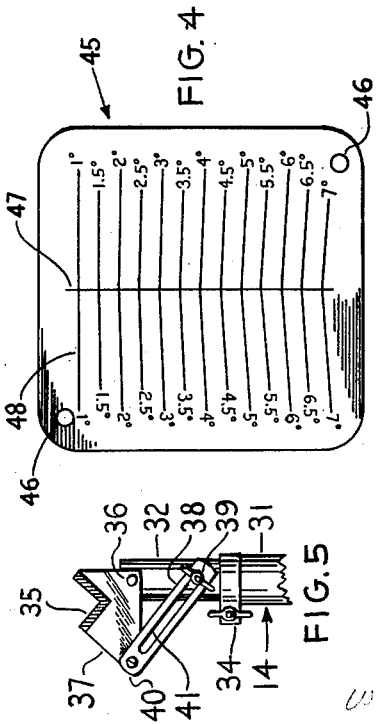
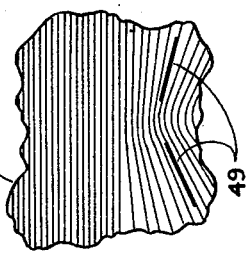
INVENTOR
EARL A. KOPS
BY *Walter J. Jason*
ATTORNEY

# United States Patent Office 2,902,898
Patented Sept. 8, 1959

2,902,898

OPTICAL INSPECTION DEVICE FOR TRANSPARENT SHEET MATERIAL

Earl A. Kops, San Diego, Calif., assignor to General Dynamics Corporation, San Diego, Calif., a corporation of Delaware Application July 28, 1954, Serial No. 446,268

3 Claims. (Cl. 88—14)

The present invention relates to inspection apparatus and more particularly to inspection apparatus for determining the presence of optical distortion in a sheet of transparent material.

Windshield installations in present day aircraft generally are composite in construction, consisting of a plurality of glass sheets separated by a vinyl lamina with one of the internal glass surfaces usually being coated with an electrical conducting layer of stannous oxide for anti-icing purposes. Fabricating techniques for such a windshield are complex and this, together with the precise heat treatment procedures employed for tempering the glass to provide improved strength properties, often produces a windshield whose external surfaces are not optically flat or parallel. Non-parallelism of these external surfaces causes an offsetting or deviation of light rays passing through the windshield which is exhibited in the form of an apparent stretching or compressing of an object observed through the windshield. Although non-parallelism of the external surfaces of the windshield is undesirable because of this particular deviation phenomenon, an even more undesirable condition is produced when there is a lack of flatness in either or both of the external surfaces. This condition is analogous to a comparatively high rate of change of the degree of light deviation and is characterized by an apparent bending or distortion of a viewed object, the bending being sometimes so extreme that the horizon, for example, may appear as a wavy, undulating line. The extent of bending may be so serious that the windshield is not acceptable for use in an aircraft, and thus, before using a windshield a means of inspection must be employed to determine if the bending or distortion is within tolerable or acceptable limits.

Investigation has shown that any existing distortion in a windshield increases with an increase in the distance between the object and the windshield, and that the distortion is also increased when the distance between the windshield and the observer or pilot is increased. Further, the angle which the line of sight of the observer bears to the plane of the windshield has a pronounced effect on the degree of distortion, as has the attitude of the observed object. The existence of these optical phenomena indicate how significant it is that the inspection means utilized in examining windshields be realistic in correlating the distortion indicated by the inspection to the distortion which would actually be observed by an aircraft pilot. General considerations of cost, space requirements, complexity, and flexibility of the inspection means are also of course exceedingly important.

The present invention provides apparatus for satisfactorily examining or inspecting windshields to determine defects therein, and in a manner which simulates the actual conditions of use of the windshields. It is to be understood of course that the present invention is suitable for inspecting windshields in general and, in addition, is also suitable for inspecting a wide variety of flat or curved panels made of various materials such as glass, plastic, or the like.

In the inspection apparatus of the present invention the examination of windshields is made as realistic as possible by placing the inspector's point of observation in a position which in effect would be that of an actual observer using the windshield. More specifically, the windshield to be inspected is set at a particular distance from a lens, the lens representing the observation point of a pilot, and, in addition, the windshield is disposed at an angle to the pilot's line of sight which closely approximates the disposition of the windshield in an actual aircraft cockpit. Selection of an observation or inspection point having been made, simulation of the objects or images in varied attitudes, as viewed by a pilot, is made by a rotatable grid spaced from the windshield in the line of sight from the inspection or pilot's eye point. The distance between the grid and the windshield is fixed at some convenient distance, and a plurality of equally spaced and parallel lines provided on the grid are suitably viewed from the lens through the windshield. The distortion of the grid lines is measured and this distortion for the fixed distance between the grid and windshield will represent a certain approximate percentage, as determined from experiments, of the distortion which would be experienced by a pilot viewing, through the test windshield, an object at a distance of infinity. This test distortion is then compared with that degree of distortion which was previously established.

Accordingly, it is a principal object to provide an improved inspection apparatus for determining quickly and effectively the presence of optical distortion in a sheet of transparent material.

Another object of the invention resides in the provision of an improved inspection appartaus for detecting the degree of optical distortion in a windshield as viewed from the position of the observer using the windshield.

It is an additional object of the invention to provide a novel apparatus which is adapted for inspecting a sheet of transparent material for distortion of light rays at various angles of incidence.

A further object of the invention is the provision of improved apparatus for examining a sheet of transparent material to determine the degree of distortion of objects observed therethrough in various positions and attitudes.

It is yet another object of the invention to provide a unique apparatus for determining the optical suitability of a sheet of transparent material and which comprises means adapted to permit remote viewing of the degree of optical distortion which would be viewed through the sheet during actual use thereof.

Another object of the invention is to provide an improved optical inspection apparatus which is simple and efficient and adapted for convenient, inexpensive, and rapid inspection of various sizes and types of windshields.

Other objects and features of the present invention will be readily apparent from the following specification and appended drawings wherein is illustrated a preferred form of the invention, and in which:

Figure 1 is a side elevational view of an inspection apparatus for measuring optical distortion in a windhield in accordance with the present invention;

Figure 2 is an end elevational view of the projection means;

Figure 3 is a detail view illustrating a typical pattern of grid line distortion as viewed by an inspector;

Figure 4 is a plan view of measuring means for determining the degree of optical distortion in a windshield; and Figure 5 is a detail view of a portion of the windshield support structure.

Referring to the drawings and first more particularly to Figures 1 and 2, there is illustrated an embodiment of the invention which is adapted for measuring the optical distortion in an aircraft windshield, although it will be apparent that the present invention is readily adapted for other uses, such as for inspecting automobile windshields and sheets or plates of transparent material in flat or curved form.

The inspection apparatus, designated in its entirety by the numeral 11, comprises generally a projection means 12 which includes an object means, reference pattern or grid 13, a support structure 14 for maintaining in a fixed position the sheet of transparent material that is to be tested, a lens 15, a mirror or reflecting surface 16 and a view plate or screen 17. As illustrated, the components just described are arranged in such relationship that projection means 12 illuminates grid 13, and the transparent sheet which is to be tested, such as windshield 18, lies disposed in the light path from grid 13. Lens 15 then serves to form or forms the resulting image or images upon view screen 17 after being reflected from reflecting surface 16 for convenient viewing by the operator or inspector.

Projection means 12 includes a rigid support frame 19 which is securely fixed to the floor and which serves to maintain grid 13 in the vertical position illustrated, and in addition serves to secure an illuminating means or light source, such as a plurality of lighting or fluorescent tubes 21 in a fixed position to the left of grid 13, as viewed in Figure 1. Tubes 21 are disposed to uniformly illuminate grid 13, preferably vertically and closely adjacent to each other across the horizontal width of grid 13.

Grid 13 is preferably made of a light diffusing material such as a glass plate provided with a light diffusing surface formed by frosting, etching, grinding, or the like, as is well known, and embodies or is provided with a plurality of accurately and uniformly spaced markings or grid lines 22, which may be placed upon grid 13 in any suitable manner such as by painting, scribing or the like. It has been found that satisfactory results are obtained with the present invention when grid lines 22 are made parallel and spaced apart a distance of approximately one-half inch; it is to be understood however that this spacing is to be considered only as typical and illustrative and that the invention is not to be limited thereto. As is apparent, grid lines 13 together with Neon tubes 21 effect the projection of an illuminated grid pattern to the right as represented by the dotted lines 23.

Since the degree of distortion in transparent materials depends to a great extent upon the attitude of the viewed object, it is desirable that grid lines 22 be disposed at various angles with the horizontal during the inspection procedure. To achieve this result, grid 13 is suitably rotatably supported by a plurality of sheaves or idlers 24, which may be four in number, and by a drive wheel 25, idlers 24 and wheel 25 being appropriately arranged about the circumference of grid 13 and operatively mounted in any suitable manner upon support frame 19. Drive wheel 25, which is identical with any one of idlers 24, is located for engagement with the peripheral edge of grid 13 as illustrated, and is coupled to and driven by a usual gear reduction box 26 through which wheel 25 is driven by a suitable electric motor 27. The rotative movement of the shaft of motor 27 is converted to a reduced rotational speed by gear reduction box 26, and rotatable grid 13 is consequently driven by wheel 25 at a relatively slow rate of rotation, such as at approximately two revolutions per minute; a slow speed of rotation is desirable to permit close examination of the projected grid pattern as will be hereinafter further described. Motor 27 and gear reduction box 26 are adapted for operation in either a clockwise or a counterclockwise direction whereby grid lines 22 on grid 13 may be easily and quickly positioned as desired by the operator or inspector. Further, substantial deviation of grid 13 from its vertical plane is prevented by the peripheral engagement of grid 13 with a reduced diameter center portion 28 provided in each of idlers 24 and drive wheel 25.

It is to be understood that the particular means utilized for effecting rotational movement of grid 13 are not critical, and various alternatives known to those in the art may be employed. For example, the driving means or motor 27 may be hydraulic or pneumatic in nature, and, in addition, use may be made of any suitable means for illuminating grid 13 in its various rotational positions for projection of grid lines 22.

Support structure 14, which is bodily movable between projection means 12 and lens 15, serves to position windshield 18 in the path of the projected grid lines 22, the outermost of which are represented by dotted lines 23, and includes in the embodiment herein illustrated a base plate 29 to which is welded a cylindrical and vertically disposed housing 31. A tubular element 32 of slightly lesser diameter than housing 31 is rotatively and slidably disposed within the bore of housing 31 and may be fixed in any vertical position by a metallic tension collar or band 33 fitted about the periphery of tubular element 32. Band 33, tightened against element 32 by a nut and bolt assembly 34, is thus adapted for halting the downward movement of tubular element 32 within housing 31 to thereby establish the vertical position of windshield 18 and consequently the disposition of windshield 18 with respect to the projected grid lines 22, as represented by the dotted lines 23 in Figure 1. The circumferential position of tubular element 32 within housing 31 is set by rotating element 32 within housing 31 to the position desired, the weight of windshield 18 being sufficient to maintain tubular element 32 in the desired circumferential position.

A frame 35 is provided for support of the windshield 18 and is mounted for pivotal movement about a pin 36 which is fixedly disposed horizontally through the upper end of tubular element 32, and through a pair of spaced legs 37 which are carried by the lower portion of frame 35. Legs 37 have a pivotal connection at their ends 40 with a pair of corresponding links 38 which serve, in cooperation with a pin and thumbscrew assembly 39, to secure frame 35, and consequently windshield 18, at the desired angle of inclination to the horizontal. It is seen that the pin of assembly 39 is fixedly disposed through approximately the mid portion of tubular element 32 and projects within slots 41 provided in links 38 whereby the pivotal position of frame 35 about pin 36 may be adjusted quickly and simply.

A plurality of padded clamps 42 are provided by frame 35 to conveniently hold windshield 18 within frame 35 and to permit ready removal and substitution of one windshield for another.

The projected grid lines 22 from projection means 12 pass through a lens 15 which is preferably rigidly mounted upon any suitable inspection stand 43. Lens 15 serves to form or focus the projected lines 22 upon reflecting surface or mirror 16, and may be of any acceptable and conventional design or construction; any lens being suitable so long as it is adapted to accept and focus images at convenient distances for viewing by an operator or inspector. Lens 15 may embody an adjustable iris (not shown), and preferably is longitudinally adjustable for exact and precise focusing. It is noted, however, that once the desired distances between grid 13, lens 15, and view screen 17 have been established, longitudinal adjustment of lens 15 is generally unnecessary to maintain proper focus.

Reflecting surface 16 is mounted in any convenient manner within inspection stand 43 at an angle such that the projected light rays passing through lens 15 are reflected upwardly onto view screen 17 where they may be conveniently viewed by the operator. Surface 16 may be made of mirrored glass, polished metal or the like, while view screen 17 is preferably made of ground or etched glass or the like. The details of fabrication of the structure of inspection stand 43 for supporting reflecting surface 16 and view screen 17 are unimportant to the present invention and for this reason such structure is not described in any great detail, it being sufficient that reflecting surface 16 and view screen 17 be maintained in fixed position. Inspection stand 43 serves as a convenient housing for enabling the operator to view on screen 17 the projected grid lines 22 without interference from stray rays of light from the outside, and to this end the inner surfaces of inspection stand 43 may be preferably coated with a non-reflective black paint or any suitable light absorbent material. In addition, a switch 44 is provided within inspection stand 43 to enable the operator to actuate and control motor 26 and hence the direction of rotation of grid 13, usual control buttons being provided for a stop position, for counter clockwise rotation, and for clockwise rotation.

The operation of inspection apparatus 11 will now be described. Tubes 21 are lighted or turned on to illuminate grid 13 and project a reference pattern of grid lines upon lens 15. It is understood that lens 15 has been positioned at a predetermined and convenient distance from grid 13, the most convenient distance being principally dictated by the available facilities in the testing area. A distance which has been found to work satisfactorily is approximately eight feet when using a lens 15 which has a focal length of approximately 26 inches. The height and lateral location of windshield 18 is next arranged such that its central portion or mid point is approximately in alignment with the mid point of grid 13, and, likewise, lens 15 is arranged in approximate alignment with the centers of windshield 18 and grid 13. Such positioning of windshield 18 will thus achieve a suitable projection of grid lines 22 therethrough and upon view screen 17 for examination thereof by an inspector or the like.

In the test procedure of the present invention, lens 15 is considered to be the pilot's eye point or observation point and remains fixed with respect to grid 13, windshield 18 being arranged at a distance from lens 15 which simulates the distance and disposition of a windshield 18 which would be the case in its actual use in the cockpit of an airplane. This is a notable feature in the testing of sheets of transparent material according to the present invention, since the distance of windshield 18 from lens 15 and the angle of incidence of the inspector's line of sight through lens 15 to windshield 18 is greatly determinative of the degree of distortion indicated to the inspector via view screen 17. A simple and convenient means of establishing the proper relationship of windshield 18 to lens 15 entails the measurement of the distance of each corner of windshield 18 from the pilot's eye point, measuring off these distances from lens 15 by means of strings or cords of the proper length, and fixing windshield 18 in this position. Of course, once the proper relationship of windshield 18 with respect to lens 15 has been established it need not be changed in subsequent production testing of windshields 18 of the same size and type. The iris of lens 15 is next adjusted or set so that the sharpest image picture of the projected grid lines 22 is formed on view screen 17 to enable the inspector to clearly observe the degree of bending of these lines 22, and hence the degree of optical distortion. The bending of lines 22 when viewed through an optically defective windshield is a phenomenon well known to those skilled in the art.

Optical distortion in windshield 18 is most noticeable or at a maximum when the viewed object, or here the representative grid lines 22, are at particular angles of disposition with respect to a reference plane passing longitudinally through the observer's line of sight from lens 15. To insure the detection of such maximum distortion, the operator should effect a slow and uniform rotation of grid 13 and in this manner bring out the maximum optical distortion in windshield 18. The degree of this maximum distortion, that is, bending of lines 22, may then be measured to determine if the distortion is within acceptable limits. Rotation of grid 13 is accomplished by motor 27 as previously described, and the actuation of motor 27 by the operator or inspector at view screen 17 is had by means of switch 44.

One suitable means of measuring the degree of bending of lines 22, that is, distortion in windshield 18, involves the use of an angle measuring device 45, which is best illustrated in Figure 4. Device 45 is a flat piece of transparent material such as plastic and is provided with a pair of knobs 46 at opposite corners to facilitate handling thereof. In addition, device 45 embodies a single vertical line 47, which serves as a reference line, and a series of other lines 48 which intersect vertical line 47, as shown, each of lines 48 representing a different degree of optical distortion. For example, line 48 identified by the numeral 1 indicates a one degree deviation from a straight line, and, similarly, the line identified by the numeral 2 denotes a line which is two degrees from a straight line. In use, the operator places angle measuring device 45 upon view screen 17 and through the use of lines 48 can measure such degree of distortion of the projected images of grid lines 22 as may exist. As seen in Figure 3, a typical distortion which may be measured by use of the device 45 is shown by the lines 49. It is here noted that merely for purposes of emphasis lines 49 have been made heavy.

As was hereinabove stated, the observed degree of distortion thus measured can be compared with that degree of distortion which was previously established as acceptable by trial and error tests of actual windshields with the assistance of aircraft pilots viewing distant objects through the windshields. The acceptable distortion established by viewing objects at substantial distances, which approximate infinity, may be used as a standard, and by experimental data and by computation the corresponding acceptable optical distortion for the test distance between windshield 18 and grid 13 may be found. This acceptable distortion is then compared with the distortion measured in the test, and rejection or acceptance of the windshield 18 is then made on the basis of this comparison.

From the description hereinabove, it will be apparent that a test or inspection apparatus has been provided which quickly and effectively determines the presence of optical distortion in a sheet of transparent material, and in addition, is adapted for determining the degree of optical distortion in a manner closely simulating the conditions of actual use of the sheet material. By manipulating the position of support structure 14 as described, many types of windshields may be accomodated and disposed in a variety of three dimensional positions, as dictated by the intended use for the windshields, to thereby achieve a realistic method of inspection. Further, the inspection method and apparatus according to the present invention is relatively simple and inexpensive and adapted for revealing the maximum distortion in a windshield for any given pilot-to-windshield relationship, or any given pilot-to-object relationship.

While certain preferred embodiments of the invention have been specifically disclosed, it is understood that the invention is not limited thereto as many variations will be readily apparent to those skilled in the art and the invention is to be given its broadest possible interpretation within the terms of the folloiwng claims:

What I claim is:

1. Inspection apparatus for optically examining transparent sheet material, said apparatus comprising a reference pattern consisting of a plurality of straight, parallel, uniformly spaced grid lines, a lens for forming an image of said reference pattern, image receiving means, means for adjustably supporting said sheet material between said reference pattern and said lens, means for rotating said reference pattern whereby the attitude of said reference pattern may be altered with respect to said sheet material, remote control means adjacent said image receiving means for controlling rotation of said reference pattern, a source of illumination disposed to cooperate with said reference pattern to permit said reference pattern to be viewed upon said image receiving means, and distortion angle measuring means adjacent said image receiving means for measuring the angle of distortion of said reference pattern caused by said sheet material.

2. Inspection apparatus for optically examining transparent sheet material, said apparatus comprising a grid consisting of a plurality of straight, parallel, uniformly spaced markings, illumination for said grid, focusing means, a view screen, an adjustable support stand for holding said sheet material in the light path from said grid to said view screen, said support stand comprising a pair of telescoping tubes for adjusting the height and horizontal angle of said sheet material, a frame connected to one of said telescoping tubes for holding said sheet material, and links connected to said frame for adjusting the vertical angle of said sheet material, means for effecting relative rotational movement between said grid and said sheet material whereby the attitude of said spaced markings may be varied with respect to said sheet material remote control means adjacent said view screen for adjusting said means for relative rotational movement, and an angle measuring protractor cooperating with said view screen for measuring angular distortion of said grid by said sheet material.

3. Inspection apparatus for optically examining transparent sheet material, said apparatus comprising a reference pattern, said pattern including a plurality of straight, parallel opaque lines formed on a translucent circular body, a source of illumination arranged to cooperate with said reference pattern, image receiving means comprising a translucent viewing screen, lens means for accepting and focusing the path of light generated by said reference pattern and said source of illumination, means for holding said sheet material in the light path, between said reference pattern and said lens means comprising a translatable supporting stand having a pair of telescoping elements for adjusting the height and horizontal angle of said sheet material, a frame connected to one of said telescoping members for holding said sheet material, and links connected to said frame for adjusting the vertical angle of said sheet material, a motor for rotating said reference pattern whereby the attitude of said reference pattern may be varied with respect to said sheet material motor control means adjacent said image receiving means for adjusting the attitude of said reference pattern, and a movable protractor of transparent material having a plurality of opaque angles thereupon placed upon said translucent viewing screen for measuring the angular distortion of said reference pattern by said sheet material.

References Cited in the file of this patent
UNITED STATES PATENTS

| | | |
|---|---|---|
| 1,272,156 | Waterloo | July 9, 1918 |
| 1,272,157 | Waterloo | July 9, 1918 |
| 1,608,725 | Currier et al. | Nov. 30, 1926 |
| 1,609,895 | Troppman | Dec. 7, 1926 |
| 1,750,883 | Ford | Mar. 18, 1930 |
| 1,939,597 | Merrill | Dec. 12, 1933 |
| 2,015,730 | Rosin et al. | Oct. 1, 1935 |
| 2,114,282 | Ames et al. | Apr. 19, 1938 |
| 2,247,047 | Bishop | June 24, 1941 |
| 2,253,054 | Tuttle et al. | Aug. 19, 1941 |
| 2,254,548 | Ruhle et al. | Sept. 2, 1941 |
| 2,379,263 | Vine | June 26, 1945 |
| 2,816,474 | Powell | Dec. 17, 1957 |

FOREIGN PATENTS

| | | |
|---|---|---|
| 229,445 | Great Britain | Feb. 26, 1925 |
| 974,768 | France | Oct. 4, 1950 |